United States Patent
Viswanathan

(10) Patent No.: US 6,476,746 B2
(45) Date of Patent: Nov. 5, 2002

(54) CELLULAR BASE STATION HAVING A HIGH SPEED, HIGH RESOLUTION DIGITAL-TO-ANALOG CONVERTER WITH OFF-LINE SIGMA DELTA CONVERSION AND STORAGE

(75) Inventor: Thayamkulangara R. Viswanathan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/725,665

(22) Filed: Nov. 29, 2000

(65) Prior Publication Data

US 2002/0063645 A1 May 30, 2002

Related U.S. Application Data

(60) Provisional application No. 60/169,819, filed on Dec. 8, 1999.

(51) Int. Cl.[7] .............................. H03M 1/66; H03M 3/00
(52) U.S. Cl. ........................................ 341/143; 341/144
(58) Field of Search ........................... 455/90; 341/143, 341/118, 136, 144, 147; 332/100, 101; 345/589; 370/321, 277

(56) References Cited

U.S. PATENT DOCUMENTS

| | | | |
|---|---|---|---|
| 5,008,671 A | * 4/1991 | Tuthill | 341/136 |
| 5,442,379 A | * 8/1995 | Bruce et al. | 345/589 |
| 5,592,166 A | * 1/1997 | Wincn | 341/144 |
| 5,701,106 A | * 12/1997 | Pikkarainen | 332/100 |
| 6,091,715 A | * 7/2000 | Vucetic et al. | 370/277 |
| 6,310,908 B1 | * 10/2001 | Reed et al. | 375/216 |

* cited by examiner

*Primary Examiner*—Patrick Wamsley
(74) *Attorney, Agent, or Firm*—April M. Mosby; W. James Brady; Frederick J. Telecky, Jr.

(57) ABSTRACT

A digital cellular base station (22) having minimum hardware requirements readily adapted to support high speed communication is disclosed herein. It includes a digital signal processor base band processor and modulator (24), a high-speed, high resolution digital-to-analog converter (26), a RF modulator (30) and an antenna (32). An input signal couples to the digital signal base-band processing modulator (24) for processing. The high-speed, high resolution digital-to-analog converter (26) couples to receive the processed signal and converts the signal into an analog one. The high-speed, high resolution digital-to-analog converter (DAC) (26) has off-line sigma delta conversion and storage which enables it to directly generat a modulated signal at an intermediate frequency, typically on the order of 100 MHz. Incorporation of DAC (26) reduces the amount of hardware necessary for the cellular base-station (22). The RF modulator (30) receives the DAC (26) output and modulates the signal to a broadcasting frequency, typically on the order of 1 G Hz. Antenna (32) couples to receive and transmit the modulated signal.

6 Claims, 2 Drawing Sheets

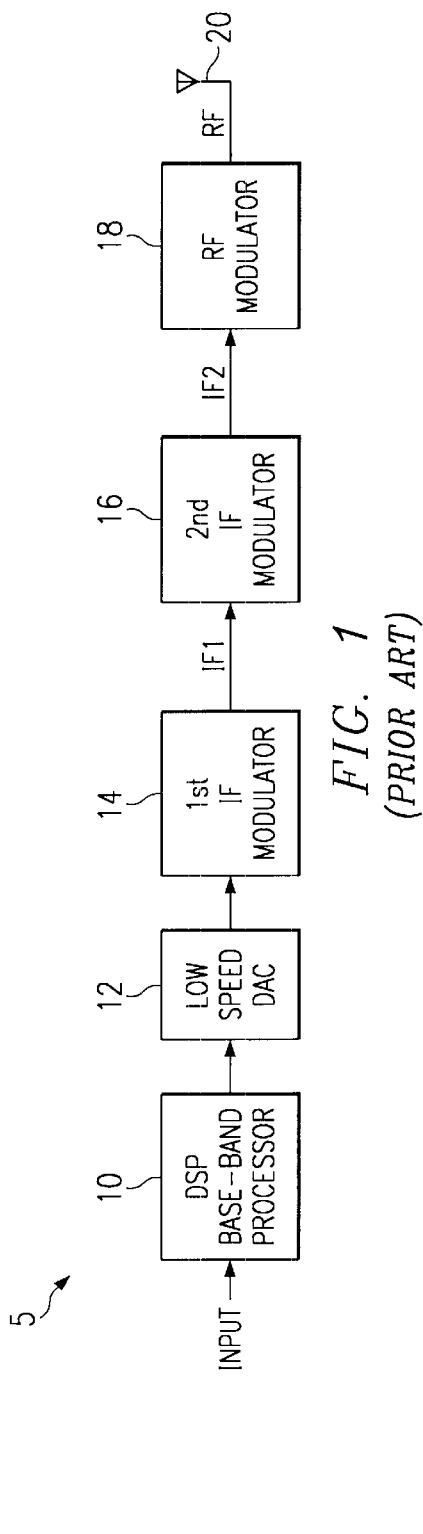
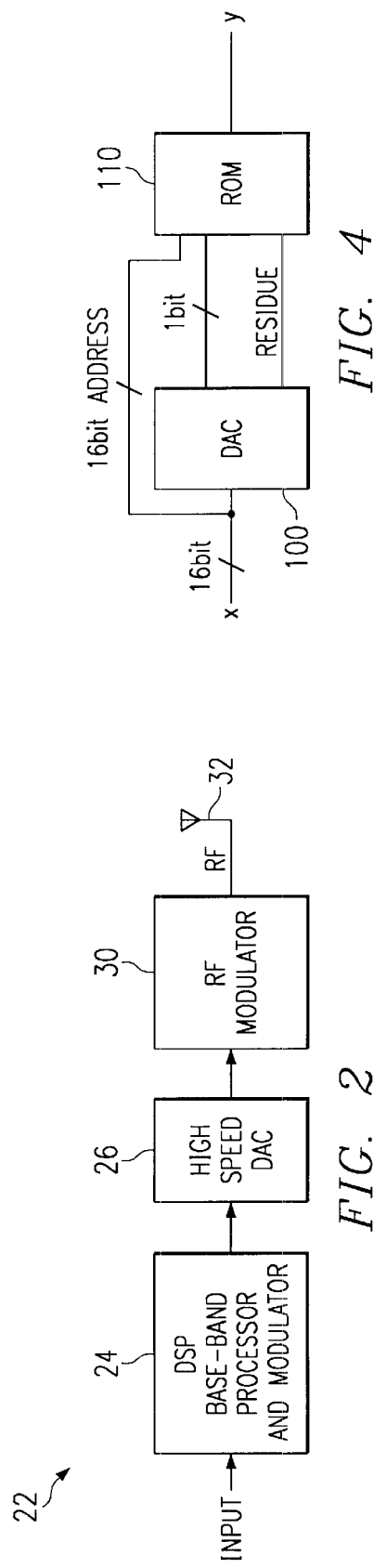
FIG. 1 (PRIOR ART)
FIG. 2
FIG. 4

CELLULAR BASE STATION HAVING A HIGH SPEED, HIGH RESOLUTION DIGITAL-TO-ANALOG CONVERTER WITH OFF-LINE SIGMA DELTA CONVERSION AND STORAGE

CROSS REFERENCE TO RELATED APPLICATIONS

This invention uses the high-speed, high-resolution digital-to-analog converter with off-line sigma-delta conversion and storage from our copending application, Ser. No. 09/725,664, filed Nov. 29, 2000, claiming priority benefit of provisional application, Serial No. 60/169,819, filed Dec. 8, 1999. This application is incorporated by reference herein.

FIELD OF THE INVENTION

This invention pertains to cellular base station and more particularly to an cellular base station having a high speed and high resolution digital-to-analog conversion using the oversampling principle.

BACKGROUND OF THE INVENTION

Cellular base stations, located at the center or on the edge of a coverage region or cell, are fixed stations within a wireless communication system used for radio communication with mobile stations. They comprise numerous radio channels and include a transmitter and receiver antenna mounted on a tower. A typical cellular base station specification requires a 16-bit DAC with an output bandwidth of 200 MHz and a spurious-free dynamic range on the order of about 100 dB. Though cost and power limitations may not be as critical where base station usage is contemplated, high resolution operation using oversampling is nevertheless complicated at increased speed. In particular, for sampling rates of approximately 400M samples per second (Nyquist sampling of a signal band-limited to 200 MHz), performing digital-to-analog conversions in real time using oversampling becomes extremely difficult and consumes vast amounts of power. And, for high speed applications, trading resolution for increase in processing speed is not an option. Thus, there is a need for a cellular base station having a high speed, high resolution digital-to-analog conversion apparatus and method.

Digital-to-analog conversion refers to the process of converting discrete digital signals into a continuous-time range of analog signals. The conversion of analog signals to digital signals and vice versa is often used in order to interface real world systems, many of which monitor continuously varying analog signals, with digital systems that read, store, interpret, manipulate and otherwise process the discrete values of sampled analog signals.

Sigma-delta modulation (sometimes called "delta-sigma modulation") provides a high resolution digital-to-analog conversion solution. It incorporates a noise-shaping technique whereby the noise of a quantizer (often 1-bit) operating at a frequency much greater than the bandwidth is moved to high frequencies not of interest in the output signal. A filter after the quantizer removes the out-of-band noise. The resulting system synthesizes a high resolution data converter, but is constructed from low resolution building blocks. Since sigma-delta DACs provide for oversampling digital to analog conversion through the sampling of signals at very high frequencies (i.e., sampling at rates much greater than the Nyquist rate), high signal-to-noise ratios are achieved. Thus, the combination of oversampling and noise shaping technologies may be implemented using a sigma-delta DAC in order to achieve high resolution without external trimming. A high speed and high resolution digital-to-analog conversion solution, however, does not presently exist. A good overview of the theory of sigma-delta modulation is given in "Oversampling Delta-Sigma Data Converters," by Candy and Temes, IEEE Press, 1992. Examples of D/A converters utilizing delta-sigma modulation are given in U.S. Pat. Nos. 4,901,077; 5,079,551; 5,185,102; 5,313,205; 5,701,106; 5,712,635; 5,786,779; 5,920,273; and 5,952,947. The disclosures of the foregoing references are incorporated herein.

Specifically, sigma-delta DACs commonly include a front-end interpolator which receives digital input samples and increases the sampling rate (typically 64–256 times the input sample rate) of the digital input samples. Techniques for increasing the sample rate, generally called interpolation, are well understood by those skilled in the art. Most designs utilize several stages of increase. A sigma-delta modulator receives the higher frequency input samples from the interpolator and converts the samples to a lower resolution (typical one-bit), high frequency bit stream. Rather than spreading quantization noise uniformly over the frequency range from 0 to the sampling Nyquist frequency, the sigma delta modulator shapes the noise so that the majority of the noise falls into the very high frequencies above the Nyquist frequency. Thus, it effectively removes the noise from the lower frequency range which is of interest for the particular applications cited above.

An oversampling DAC which utilizes a second order sigma-delta quantizer and an analog low pass filter to convert the data from the sigma-delta quantizer to analog signal is a very effective device for low speed audio applications. This implementation, however, is inappropriate for high speed applications such as the cellar base station of the aforementioned criteria. In addition, this type of DAC has a relatively high output data transition rate, requiring higher power than is desirable. Moreover, considering oversampling interpolations on the order of n=256 for high sampling rates, such as the 400M samples/sec required for cellular base station applications, extreme clocking speeds (400 MHz×256) become a serious design obstacle.

Thus, there exists a need for an improved cellular base station having a DAC operable at higher speed than heretofore achievable which exploits the sigma-delta principle in a different way.

SUMMARY OF THE INVENTION

A digital cellular base station having minimum hardware requirements readily adapted to support high speed communication is disclosed herein. For providing a solution to the above described need, the cellular base station includes a digital signal processor base band processor and modulator, a high-speed, high resolution digital-to-analog converter, a first modulator, a second modulator and an antenna. An input signal couples to the digital signal base-band processing modulator to be processed. The high-speed, high resolution digital-to-analog converter couples to receive the processed signal and converts the signal into an analog one. The first and second modulators, respectively, receive and modulate the signal to two different speeds, a second and a third speed, respectively. Finally, the antenna couples to receive and transmit the signal at the third speed from the second modulator.

The high-speed, high resolution digital-to-signal processor includes a storage means for storing delta-sigma bit sequences corresponding to all possible values of a digital input coupled to a plurality of one-bit digital to analog converters. Each of the digital to analog converters are clocked by multi-phase clocks such that each phase applied to each one of the digital to analog converter is delayed with respect to a next one by the oversampling period, which is the Nyquist period divided by the number of predetermined interpolated samples. An analog summer is coupled to all the digital-to-analog converters for summing all the outputs from the plurality of digital to analog converters to generate an analog output. Incorporation of the high-speed, high resolution digital-to-analog converter reduces the amount of hardware necessary for cellular base-stations.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 1 shows a block diagram of a known cellular base station;

FIG. 2 illustrates a block diagram of a cellular base station in accordance with the present invention;

FIG. 4 illustrates the block diagram for the off-line processing of output sequences for the high speed high resolution digital-to-analog converter in accordance with the present invention.

DETAILED DESCRIPTION OF PREFERRED EMBODIMENTS

Figure 3:
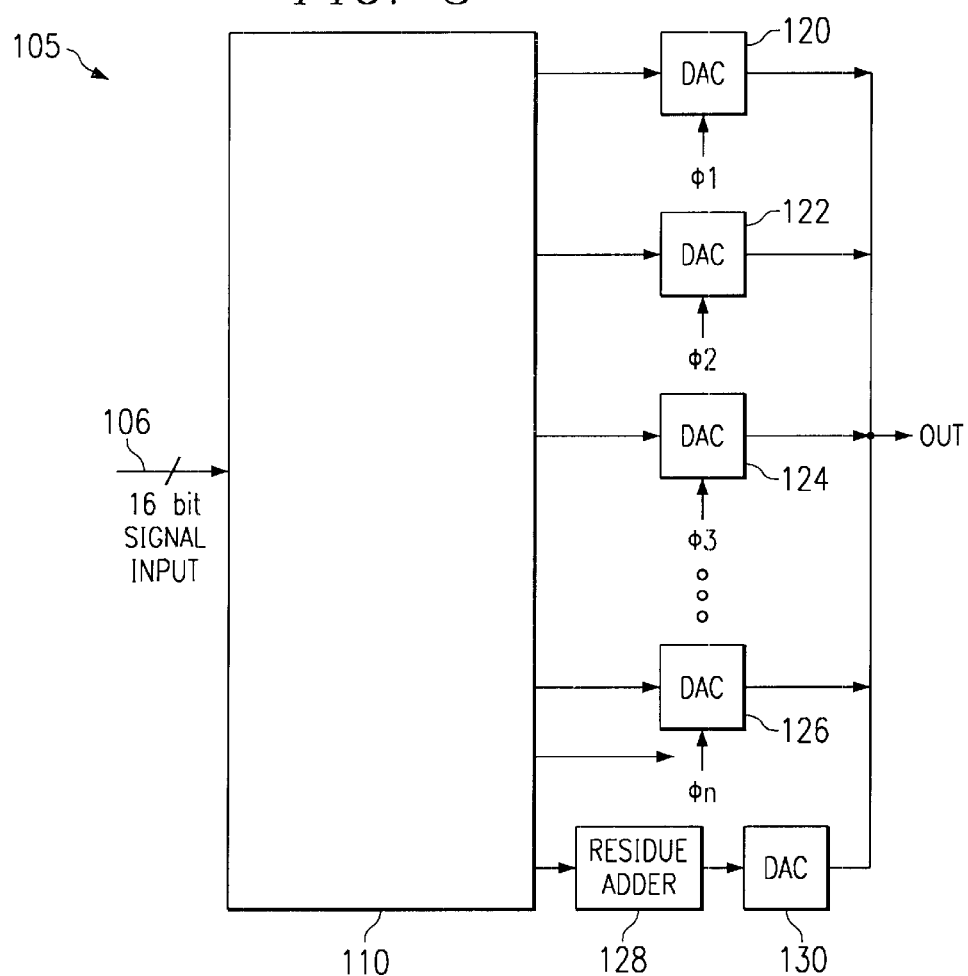
FIG. 3 displays a high speed, high resolution digital-to-analog converter in accordance with the copending application.

The present invention is best understood by comparison with the prior art. Hence, this detailed description begins with a discussion of a well-known cellular base station, as shown in FIG. 1. An input couples to the digital signal processor (DSP) shown as base band processor 10. The processed digital signal is received by a low speed digital-to-analog converter 12 that is coupled to the output of the base band processor 10. The converted analog signal is received by a first modulator 14 which modulates the signal to a first intermediate frequency (IF), typically on the order of 10M Hz. A second modulator 16 couples to receive the modulated signal and further modulates the signal to a second intermediate frequency, typically on the order of 100 M Hz. A third modulator 18 receives the modulated signal at 100 M Hz and modulates the signal to a broadcasting frequency typically on the order of 1 G Hz. This signal is transmitted over antenna 20.

A cellular base station 22 in accordance with the present invention shown in FIG. 2 includes an DSP base-band processor and modulator 24, a high speed, high resolution DAC 26, a radio frequency (RF) modulator 30 and an antenna 32. The DSP base-band processor and modulator 24 processes the input signal. The processed signal is converted from digital to analog by the high speed, high resolution DAC 26 coupled to DSP base-band processor and modulator 24. The high speed, high resolution DAC 26 of co-pending application, Serial No. 60/169,819, filed Dec. 08, 1999 has off-line sigma-delta conversion and storage which enables it to directly generate a modulated signal at a first intermediate frequency, typically on the order of 100 MHz. The RF modulator 30 couples to receive the output of the DAC 26 and further modulates the signal to a broadcasting frequency, typically on the order of 1 G Hz. This signal is transmitted over antenna 32.

As in shown in FIG. 2, the cellular base station 22 in accordance with the present invention reduces the hardware necessary to directly generate the modulated signal at the first intermediate frequency, typically on the order of 100 MHz.

The high speed, high resolution DAC 26 of co-pending application Ser. No. 09/725,664, filed Nov. 29, 2000 claiming priority from provisional application Serial No. 60/169, 819, filed Dec. 8, 1999 is incorporated by reference herein. FIG. 3 displays the high speed, high resolution digital-to-analog converter 105 in accordance with the copending application. A 16-bit input word at the input signal 106 addresses the read-only memory 110 of FIG. 4 that contains the pre-computed delta-sigma values corresponding to all possible 16-bit inputs. The values stored in the read-only memory 110 when addressed by the input signal 106 will output all the stored values of the sigma delta sequence simultaneously. The output can be converted to the required analog signal by using a plurality of one bit digital to analog converters (DACS) 120, 122, 124 and 126 coupled to the n outputs of ROM 110, each clocked by multi-phase clocks each delayed with respect to the next by the oversampling period. The data stored in ROM 110 is compressed if necessary to minimize the number of storage cells or size of the ROM 110. Depending upon what is stored in ROM 110, the data output from the ROM 110 may be in variety of useful, low transition rate formats.

FIG. 4 illustrates the apparatus used which provide off-line processing of output sequences for high speed high resolution DAC 105. A 16-bit input word is received by a sigma-delta converter 100 that is coupled to a read-only memory 110. The input signal and the output signal of the sigma-delta converter 100 is coupled to the read-only memory 110 to be stored as a table. In operation, sigma delta conversion pre-calculated off-line to generate the output sequence as well as residue if not negligible. This becomes possible since the conversion of one value of the signal is independent of the previous history of the inputs. Thus, the 65,536 values corresponding to all possible 16-bit inputs can be fed on a one-at-a-time basis into the off-line sigma delta converter. The converter runs for n cycles where n is the oversampling factor. The output sequence of n bits and residue obtained from this off-line computation are stored in a read-only memory 110 addressable by a 16-bit input word.

Figure 5:
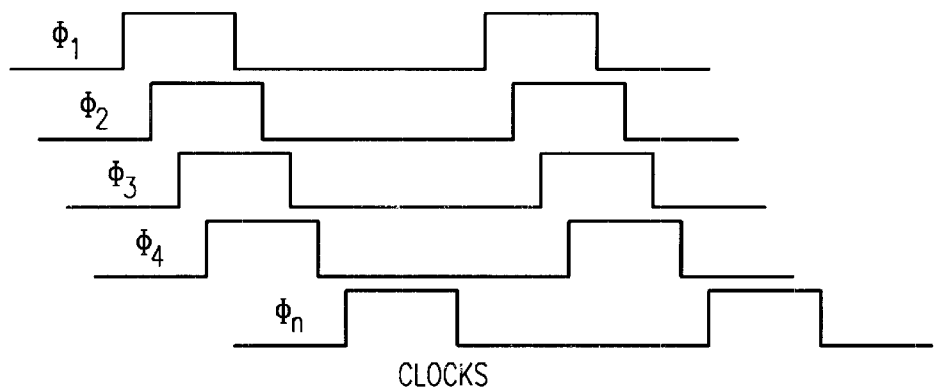
FIG. 5 displays the timing delay input clock signals for the high speed, high resolution digital-to-analog converter in accordance with the present invention.

Given a delay-lock loop and n one-bit DAC's 120, 122, 124 and 126, when the memory is addressed by an input, the whole stored bit-sequence as well as the residue is transferred to the output simultaneously. The sequence is stored as a column, these bits are fed to the DAC's 120, 122, 124 and 126 in parallel as shown. Each DAC 120, 122, 124 and 126 may be implemented using a current steering arrangement having a single differential pair and a tail current source. Each differential pair is switched by a clocked flip-flop thereby transferring current from one side to the other. The DAC's 120, 122, 124 and 126 are clocked with delayed clocks shown in FIG. 5. The delay between adjacent clocks is the T/n where T is the Nyquist period. This multi-phase clock must be obtained using a delay-lock loop with very low jitter. For improved accuracy reasons, if stored residues are outputted, a separate residue adder 128 and DAC 130 will be necessary. These values will be added in the digital domain. Only when the value of the residue becomes appreciable (i.e. when the most significant bit becomes one) will it be converted to analog and added to the output as a correction.

The analog output obtained by summing all the DAC 120, 122, 124 and 126 outputs then emulates a sigma-delta DAC yet this embodiment provides both high speed and high resolution not possible by prior art sigma-delta solutions.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A cellular base station having a digital input signal at a first speed and an analog output comprising:

a digital signal base-band processing modulator for processing and modulating the digital input signal;

a high speed digital-to-analog converter coupled to the digital signal base-band processing modulator for converting the digital signal to a converted analog signal at an intermediate frequency, wherein the high speed digital-to-analog converter includes, a storage means having stored outputs of a number of predetermined interpolated samples of a delta-sigma converter corresponding to all possible values of said digital input, said storage means coupled to receive said digital input, a plurality of digital-to-analog converters coupled to said storage means to receive said stored outputs, said plurality of digital-to-analog converters clocked by multi-phase clocks wherein each phase applied to each of said plurality of digital to analog converters is delayed with respect to a next one by an oversampling period equal to the Nyquist period divided by the number of predetermined interpolated samples, and a plurality of digital-to-analog converters coupled to said storage means to receive said stored outputs, said plurality of digital-to-analog converters clocked by multi-phase clocks wherein each phase applied to each of said plurality of digital to analog converters is delayed with respect to a next one by an oversampling period equal to the Nyquist period divided by the number of predetermined interpolated samples, and a summer coupled to said plurality of digital-to-analog converters for summing all output from said plurality of digital-to-analog converters to generate said analog output;

a radio frequency modulator coupled to the high speed digital-to-analog converter to receive the converted analog signal and to modulate the signal at a broadcasting frequency, the broadcasting frequency is greater than the intermediate frequency of the signal; and an antenna coupled to receive and transmit the radio frequency signal at the broadcasting frequency.

2. The cellular base station of claim 1, wherein the intermediate frequency is 100 M Hz, and the broadcasting frequency is 1 G Hz.

3. The delta-sigma digital-to-analog converter of claim 1 wherein said storage means is a read/write programmable memory.

4. The delta-sigma digital-to-analog converter of claim 1 wherein said storage means is a read only memory.

5. A cellular base station having a digital input signal at a first speed and an analog output comprising:

a digital signal base-band processing modulator for processing and modulating the digital input signal;

a high speed digital-to-analog converter coupled to the digital signal base-band processing modulator for converting the digital signal to a converted analog signal at an intermediate frequency, wherein the high speed digital-to-analog converter includes, a storage means having stored compressed outputs of a delta-sigma converter fed by a number of predetermined interpolated samples corresponding to all possible values of said digital input, said storage means coupled to receive said digital input, an expansion unit coupled to said storage means for expanding said compressed outputs, a plurality of digital-to-analog converters coupled to said expansion unit to receive said expanded stored outputs, said plurality of digital-to-analog converters clocked by multi-phase clocks wherein each phase applied to each of said plurality of digital to analog converters is delayed with respect to a next one by an oversampling period equal to the Nyquist period divided by the number of predetermined interpolated samples, and a summer coupled to said plurality of digital-to-analog converters for summing all output from said plurality of digital-to-analog converters to generate said analog output;

a radio frequency modulator coupled to the high speed digital-to-analog converter to receive the converted analog signal and to modulate the signal at a broadcasting frequency, the broadcasting frequency is greater than the intermediate frequency of the signal; and an antenna coupled to receive and transmit the radio frequency signal at the broadcasting frequency.

6. The cellular base station of claim 5, wherein the storage means is a read only memory having stored outputs of a number of predetermined interpolated samples of a delta-sigma converter corresponding to all possible values of a digital input.

* * * * *